United States Patent
Desai et al.

(10) Patent No.: US 9,197,332 B2
(45) Date of Patent: Nov. 24, 2015

(54) FAST DETECTION OF COLLOCATED RF JAMMERS FACILITATING OPTIMIZED GAIN SETTING SELECTION OF FRONT-END RECEIVER AMPLIFIERS

(71) Applicant: Broadcom Corporation, Irvine, CA (US)

(72) Inventors: Prasanna Desai, Elfin Forest, CA (US); Gabriel Desjardins, San Francisco, CA (US); Vincent Roussel, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 328 days.

(21) Appl. No.: 13/871,666

(22) Filed: Apr. 26, 2013

(65) Prior Publication Data

US 2014/0221028 A1    Aug. 7, 2014

Related U.S. Application Data

(60) Provisional application No. 61/762,294, filed on Feb. 7, 2013.

(51) Int. Cl.
| H04B 7/00 | (2006.01) |
| H04B 15/00 | (2006.01) |
| H04B 10/69 | (2013.01) |
| H04B 17/13 | (2015.01) |

(52) U.S. Cl.
CPC .............. *H04B 15/00* (2013.01); *H04B 10/693* (2013.01); *H04B 10/6931* (2013.01); *H04B 17/13* (2015.01)

(58) Field of Classification Search
USPC .......... 455/426.1, 435.1, 63.1, 501, 524, 525, 455/552.1
See application file for complete search history.

(56) References Cited

U.S. PATENT DOCUMENTS

| 6,497,683 | B1 * | 12/2002 | Pagni ............................ 604/174 |
| 7,653,368 | B2 * | 1/2010 | Ashkenazi ................. 455/234.1 |
| 8,761,829 | B2 * | 6/2014 | Medepalli ................. 455/552.1 |
| 8,855,079 | B2 * | 10/2014 | Banerjea ....................... 370/329 |
| 2005/0075077 | A1 * | 4/2005 | Mach et al. ................. 455/67.13 |
| 2007/0004336 | A1 * | 1/2007 | Aloni-Lavi et al. .......... 455/63.1 |
| 2008/0056413 | A1 * | 3/2008 | Demir et al. .................. 375/345 |
| 2008/0298341 | A1 * | 12/2008 | Fujiwara et al. .............. 370/350 |
| 2009/0298522 | A1 * | 12/2009 | Chaudhri et al. ............. 455/509 |
| 2009/0312047 | A1 * | 12/2009 | Satou et al. ................... 455/522 |
| 2010/0097951 | A1 * | 4/2010 | Espina Perez et al. ....... 370/252 |
| 2010/0195547 | A1 * | 8/2010 | Vice et al. ..................... 370/311 |

(Continued)

*Primary Examiner* — Dominic E Rego
(74) *Attorney, Agent, or Firm* — Fiala & Weaver P.L.L.C.

(57) ABSTRACT

In collocated radios, interference is mitigated to permit concurrent radio operation. In response to detection of imminent transmission of interfering wireless (i.e., RF jammer) signals, gain settings of one or more stages of front-end receiver amplifiers may be quickly configured to permit concurrent frequency division operation instead of consecutive time-division operation. This expansion of concurrent operation may improve communication bandwidth and/or may produce reliable, consistent results. Gain control responsive to detection of imminent RF jamming may maintain amplification in a linear range where interference can be filtered out. Receiver gain may be shifted from a default high gain or high sensitivity setting to lower gain to maintain integrity of a signal of interest (SoI), which avoids clipping, distortion and unwanted products caused by a high power jamming signal that could otherwise make it impossible to recover the SoI. This mitigation technique supplements and/or replaces other interference mitigation techniques.

20 Claims, 4 Drawing Sheets

(56) References Cited

U.S. PATENT DOCUMENTS

| | | | |
|---|---|---|---|
| 2010/0214939 A1* | 8/2010 | Ryan | 370/252 |
| 2010/0226267 A1* | 9/2010 | Jang et al. | 370/252 |
| 2011/0021168 A1* | 1/2011 | Weissman et al. | 455/234.1 |
| 2011/0235758 A1* | 9/2011 | Khoini-Poorfard et al. | 375/345 |
| 2011/0249576 A1* | 10/2011 | Chrisikos et al. | 370/252 |
| 2012/0194798 A1* | 8/2012 | Crawford et al. | 356/4.02 |
| 2012/0202561 A1* | 8/2012 | Robinett | 455/552.1 |
| 2012/0264381 A1* | 10/2012 | Eisenhut et al. | 455/90.1 |
| 2012/0315950 A1* | 12/2012 | Wang | 455/552.1 |
| 2013/0051318 A1* | 2/2013 | Matsuo et al. | 370/328 |
| 2013/0077502 A1* | 3/2013 | Gainey et al. | 370/252 |
| 2013/0115941 A1* | 5/2013 | Banerjea et al. | 455/426.1 |
| 2014/0087663 A1* | 3/2014 | Burchill et al. | 455/41.2 |
| 2014/0087664 A1* | 3/2014 | Majjigi et al. | 455/41.2 |

\* cited by examiner

FAST DETECTION OF COLLOCATED RF JAMMERS FACILITATING OPTIMIZED GAIN SETTING SELECTION OF FRONT-END RECEIVER AMPLIFIERS

CROSS REFERENCE TO RELATED APPLICATIONS

This application claims the benefit of U.S. Provisional Patent Application No. 61/762,294, entitled "Fast Detection of Collocated Radio Frequency (RF) Jammers Facilitating Optimized Gain Setting Selection of Front-End Receiver Amplifiers," filed Feb. 7, 2013, which is hereby incorporated herein by reference in its entirety and made part of this application for all purposes.

Commonly assigned U.S. Pat. No. 8,200,161, entitled "Method and System for Dynamic Selection of a Coexistence Method and Transmit Power Level Based on Calibration Data," issued Jun. 12, 2012, is hereby incorporated herein by reference in its entirety and made part of this application for all purposes.

BACKGROUND

Many electronic devices, e.g., mobile phones and tablet devices, include circuitry that facilitates wireless (i.e., radio frequency (RF)) communications according to multiple standards or specifications. For example, a mobile phone may communicate in accordance with cellular standards, such as Advanced Mobile Phone ("AMPS"), digital AMPS, Global System for Mobile communications ("GSM"), Code Division Multiple Access ("CDMA"), Local Multi-point Distribution Systems ("LMDS"), Long Term Evolution ("LTE"), Multi-channel-Multi-point Distribution System (MMDS), among others. A mobile phone may additionally communicate in accordance with general purpose wireless standards, such as Bluetooth ("BT") and Wireless Local Area Network ("WLAN") (e.g., 802.11-based), among others. In some circumstances, concurrent communications in accordance with multiple wireless communication standards can interfere with each other, leading to communication failures and/or data loss.

BRIEF DESCRIPTION OF THE DRAWINGS/FIGURES

The drawings, which are incorporated herein, illustrate a plurality of embodiments. Embodiments are not limited to the specific implementations disclosed herein. Unless expressly indicated by common numbering, each figure represents a partially or entirely different embodiment where components and steps in each embodiment are intentionally numbered differently compared to potentially similar components in other embodiments.

DETAILED DESCRIPTION

I. Introduction

Figure 1:
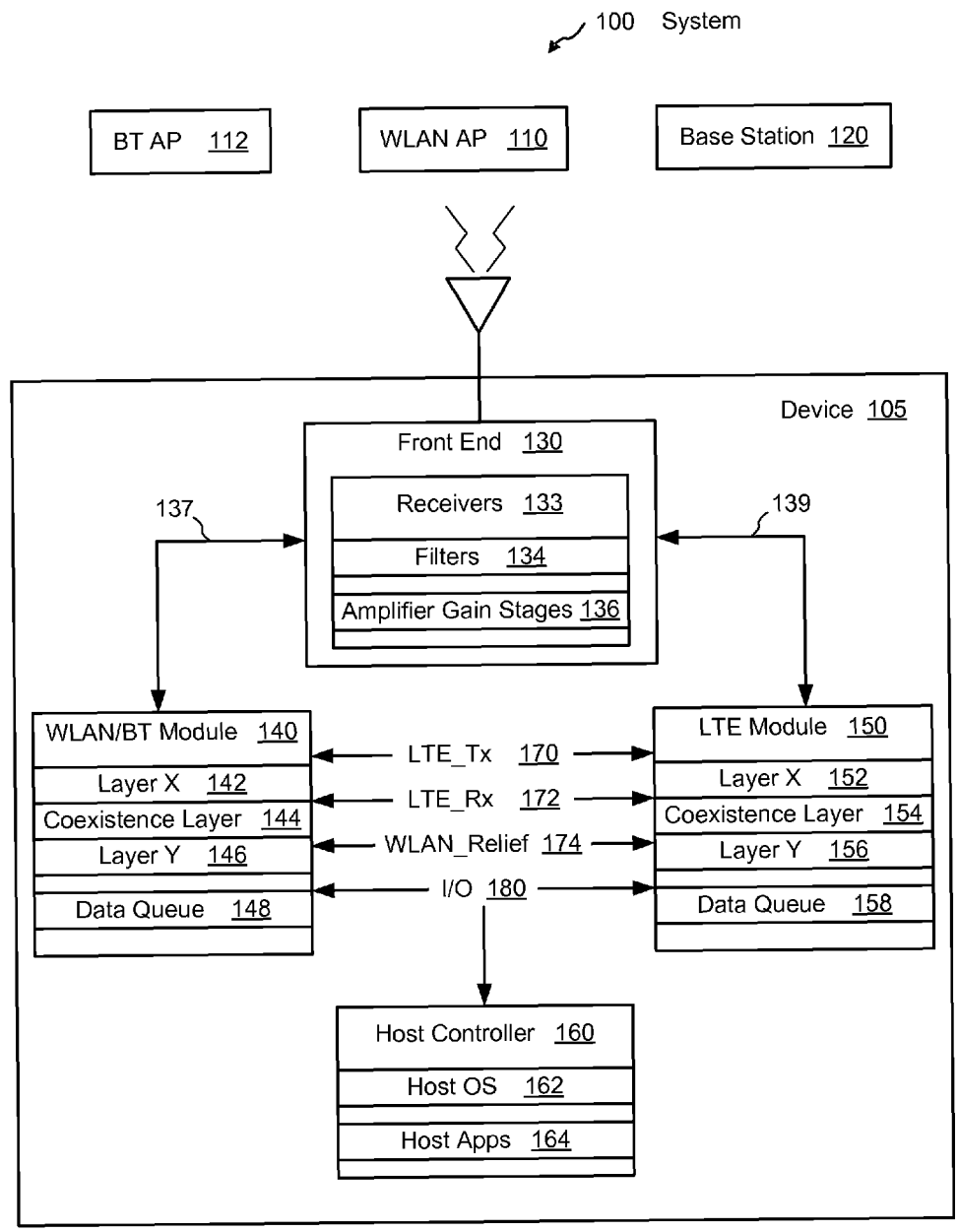
FIG. 1 illustrates a block diagram of an exemplary embodiment of an RF communication coexistence system in which present embodiments may be implemented.

The following detailed description provides exemplary (non-exclusive) embodiments, with reference to the accompanying drawings. The scope of the disclosed technologies includes other embodiments not addressed herein.

An embodiment may include a particular feature, structure, characteristic or step, but every embodiment may not necessarily include the particular feature, structure, characteristic or step. Whether or not explicitly described, it is submitted that it is within the knowledge of one skilled in the art to implement features, structures, characteristics or steps.

The discussion of embodiments is not intended to distinguish between components that differ in name but not function. Terms "including" and "comprising" are open-ended (non-exclusive), and thus should be interpreted to mean "including, but not limited to . . . " Also, the term "couple" is intended to mean either an indirect or direct electrical connection.

II. Overview

Methods, systems, and apparatuses are described for mitigating wireless transmission interference with collocated radios to permit concurrent radio operation. In response to detection of imminent transmission of interfering wireless (i.e., RF jammer) signals, gain settings of one or more stages of front-end receiver amplifiers may be quickly configured to permit concurrent or frequency division operation instead of consecutive or time-division operation. This expansion of concurrent operation may reliably and consistently improve communication bandwidth. Gain control responsive to detection of imminent RF jamming may maintain amplification in a linear range where interference can be filtered out. Receiver gain may be shifted from a default high gain or high sensitivity setting to lower gain to maintain integrity of a signal of interest (SoI), which avoids clipping, distortion and unwanted products caused by a high power jamming signal that could otherwise make it impossible to recover the SoI. This mitigation technique supplements and/or replaces other interference mitigation techniques.

Given an increasingly crowded spectrum, shrinking device form factors and increasing wireless communication capabilities, it is becoming more common for RF jammer signals to overwhelm traditional wireless signal interference mitigation techniques inadequate. Sequential time division multiplexing (TDM) operation involves time sharing and prevents concurrent operation, which compromises maximum throughput. Therefore, TDM should be used sparingly. However, powerful RF jammers such as LTE may necessitate TDM coexistence. Filters may be insufficient with overwhelming RF jammers. Moreover, certain wireless communication filters operate unsatisfactorily while other filters are too costly and/or cause substantial insertion loss. Frequency hopping by changing frequency channels or bands may also be insufficient to permit concurrent operation with a high power jamming signal. Static and dynamic isolation such as circuit placement and antenna assignment may also be insufficient to permit concurrent operation with a high power jamming signal, especially given shrinking form factors. Other techniques are reactionary after jamming is detected or involve guesswork in advance of RF jamming and inevitably unnecessary overreactions that produce inconsistent results.

A mobile device (e.g., a personal digital assistant, cellular telephone, tablet computer, etc.) may have collocated radios, such as LTE, BT and WLAN. However, WLAN and BT receiver sensitivity suffers when collocated LTE transmissions occur. Costly film bulk acoustic resonator (FBAR) filters and clever board placement of antennas to maximize isolation may help, but extreme proximity of certain LTE bands to the 2.4 GHz Industrial, Scientific, and Medical ("ISM") band renders desensitization to BT and WLAN receivers unavoidable.

Some embodiments described herein adapt to a coexistence signaling scheme involving an LTE transmit (LTE_TX) signal, which provides BT and WLAN radios notification about imminent jammer presence. BT and/or WLAN radios respond by engaging one or more gain stages of a front end receiver amplifier to optimize them for blocker performance instead of sensitivity (high gain) performance. This technique is reliable and relatively fast, and it outperforms RSSI detection based techniques. Other embodiments described herein use RSSI (e.g., WRSSI) detection to detect collocated jammers and use RSSI data as a parameter.

Because LTE bands are so close to BT and/or ISM frequencies, they may cause unidirectional or bidirectional interference. An LTE system can transmit at a maximum power level of 27 dBm. A WLAN system may transmit at 20 dBm. BT may transmit at 12-13 dBm.

Frontend receiver gain may be controlled by an automatic gain control (AGC) algorithm. This algorithm may generally be optimized to maximize sensitivity performance (e.g. maximum gain). However, interfering wireless (i.e., RF jammer) signals may saturate high gain amplifiers, resulting in clipping, distortion, intermodulation products, etc. In turn, this results in an inability to recover a signal. An AGC algorithm may be optimized for jammer signal detections. Jammers may be detected by a warning signal (e.g. LTE_TX) or a received signal strength indicator (RSSI) detector, including a wideband RSSI that measures signal strength of signal of interest (SoI) and additional frequency regions. LTE transmit power and other prevailing conditions or parameters may be accessed to control a frontend receiver, e.g., by an algorithm that determines appropriate gain setting from a gain table. WRSSI detector data may be a parameter to automatically select linear (instead of sensitivity) gain settings for the frontend amplifier. Additional parameters or prevailing conditions in an AGC control algorithm to determine relative isolation, expected interference and gain mitigation may include jammer frequency or band, transmit power, modulation bandwidth, receiver temperature, which antennas are being used, etc.

In response to detection of imminent transmission of jammer signals, gain settings of one or more stages of front-end receiver amplifiers are quickly configured to permit concurrent or frequency division operation instead of consecutive or time-division operation. This expansion of concurrent operation improves communication bandwidth and produces reliable, consistent results. Gain control responsive to detection of imminent RF jamming may maintain amplification in a linear range where interference can be filtered out. Receiver gain may be shifted from a default high gain or high sensitivity setting to lower gain to maintain integrity of a signal of interest (SoI), which avoids clipping, distortion and unwanted products caused by a high power jamming signal that could otherwise make it impossible to recover the SoI. This mitigation technique supplements and/or replaces other interference mitigation techniques. Embodiments may be implemented as an override to TDM and/or other coexistence techniques as prevailing conditions, and the capability to overcome them, permit concurrent communication.

Wireless communication interference among different types of wireless communication may be mitigated by detecting imminent transmission of a first type of wireless communication that will interfere with a reception of a second type of wireless communication. The first and second types of wireless communication may be, for example, LTE and BT or vice versa. In response to the detection, a gain of a receiver of the second type of wireless communication is automatically configured for linear performance that permits the transmission and the reception to occur concurrently. Relative to a sensitivity performance configuration for the receiver, a linear performance configuration may include a reduction in gain in one or more stages in the receiver. Additionally or alternatively in response to the detection, a transmitter of the second type of wireless communication (such as a BT or WLAN access point) may be requested to increase wireless transmission power, thereby increasing a communication link margin for reception of the second type of wireless communication.

Receiver gain stages may be common to second and third types of wireless communication, such as in a device with BT and WLAN capability. In some embodiments, WLAN and BT may arbitrate for control over gain settings in common stages.

Parameters may be monitored and used to select an appropriate gain in response to detection of an imminent RF jammer signal. For example, a transmission frequency channel or band of the first and second types of wireless communication may be monitored to determine a degree of isolation between them. A transmission power of the first and/or second types of wireless communication may be monitored to determine a degree of isolation. A transmission modulation bandwidth of the first and/or second types of wireless communication may be monitored to determine a degree of isolation. Physical isolation (e.g., distance between circuitry and antennas) between the transmitter of the first type of wireless communication and the receiver of the second type of wireless communication may be monitored to determine a degree of isolation. The type of filtering by the receiver may be monitored to determine tolerances, i.e., under what conditions the received SoI may be recoverable. A temperature of the receiver may be monitored to determine how components such as certain filters may operate under prevailing conditions. One or more of these and other parameters may be used to determine what gain setting(s) in one or more gain stages of a receiver would be necessary to permit concurrent transmission of the first signal and reception of the second signal. These gain stages and the algorithm(s) responsible for selecting among and between them may be implemented in a wide variety of forms, including gain table(s) or hardware and/or software logic.

The present interference mitigation techniques may be implemented alone, consecutively, alternately or concurrently with other interference mitigation techniques, such as configuring one or more gain stages of the receiver based on received signal strength indicator (RSSI) data, frequency hopping (e.g., changing a frequency channel or band) of the second type of wireless communication, assigning an antenna for one or both of the first and second types of wireless communication and arbitrating sequential communication of the first and second types of wireless communication by time division multiplexing (TDM). Selection of the interference mitigation technique alone, consecutively, alternately or concurrently with other interference mitigation techniques may be based on parameters used to select an appropriate gain.

Wireless communication interference among different types of wireless communication may be mitigated by determining an estimated amount of isolation between a first wireless signal in accordance with a first wireless communication standard and a second wireless signal in accordance with a second wireless communication standard. This isolation can be determined according to a variety of monitored parameters as previously indicated, such as one or more of a frequency band or channel of the first and second wireless signals, a power of the first and second wireless signals, a modulation bandwidth of the first wireless signal, a temperature of the receiver, and/or antennas communicating the first and second signals. From the estimated amount of isolation between first and second signals, the extent that the first wireless signal would interfere with the second wireless signal may be determined. As a technique to permit concurrent communication, one or more gain settings for at least one gain stage in a frontend of a receiver may be selected based on (and designed to overcome) the determined extent that the first wireless signal would interfere with the second wireless signal.

The foregoing mitigation technique may be initiated in response to a detection of an imminent transmission of the first wireless signal that will interfere with a reception of the second wireless signal. Alternatively or additionally, the foregoing mitigation remedy may also be initiated in response to an estimation of an amount of power to be received by the receiver in accordance with a received signal strength indicator (RSSI) technique.

A device or system configured to implement an interference mitigation technique may comprise communication circuitry configured to wirelessly communicate a first wireless signal in accordance with a first wireless communication standard and wirelessly communicate a second wireless signal in accordance with a second wireless communication standard where, in at least some circumstances during concurrent communication, the first signal interferes with the second signal. The wireless communication circuitry may also be configured to wirelessly communicate in accordance with a third wireless communication standard. For example, the first wireless communication standard may comprise LTE, the second wireless communication standard may comprise BT and the third wireless communication standard may comprise WLAN.

A coexistence manager may be configured to receive a warning signal indicating a future transmission time for the first wireless signal. Then the coexistence manager may automatically select a gain setting for one or more stages in a receiver in the wireless communication circuitry to preserve the linearity of the received second wireless signal during concurrent communication of the first and second wireless signals. In some implementations, the gain setting of the receiver may be common to wireless communication signals of the second and third wireless communication standards. The coexistence manager may also be configured to automatically request that a transmitter of the second wireless signal increase wireless transmission power, in order to increase a communication link margin for reception of the second wireless signal.

The coexistence manager may be configured to monitor parameters and to select gain settings based on the prevailing conditions indicated by the plurality of parameters. The coexistence manager may be configured to select the interference mitigation technique alone, consecutively, alternately or concurrently with other interference mitigation techniques, e.g., based on one or more parameters monitored and used to select an appropriate gain.

Exemplary embodiments are described with non-exclusive reference to LTE, BT, and WLAN for illustrative purposes. Mitigation techniques for concurrent communication are applicable to any suitable standards and/or services and any suitable device, including mobile devices and/or non-mobile devices. The techniques described herein may be used for detecting and reacting to any suitable collocated jammer. Disclosed techniques for wireless interference mitigation are capable of mitigating interference that occurs even after BT and/or WLAN start receiving a packet. Although examples described herein relate to BT and WLAN receivers mitigating the effect of an LTE jammer, the inverse case is applicable. For example, an LTE receiver may detect and mitigate a strongly collocated WLAN transmission. In accordance with this example, the LTE receiver may quickly select a gain setting optimized for linearity versus noise figure to mitigate desensitization of the LTE receiver by the WLAN transmission.

The techniques described herein have a variety of benefits as compared to other RF interference mitigation techniques. For instance, the techniques described herein may shift the inflexion point at which TDM coexistence outperforms FDM coexistence. TDM coexistence involves time sharing the medium and therefore compromises maximum throughput. FDM allows collocated radios to operate independently and concurrently so long as suitable technique(s), such as any one or more of those described herein, are used to mitigate the impact of the interference.

III. Example Embodiments

Incorporated U.S. Pat. No. 8,200,161, e.g., in FIGS. 1, 2A-C and 3 and accompanying discussion therein, presents exemplary systems, subsystems, devices and wireless interference mitigation techniques in which embodiments of techniques disclosed herein may be implemented and/or in conjunction with which such embodiments may be implemented.

Additional figures herein provide additional details relative to and consistent with the exemplary systems, subsystems, devices and wireless interference mitigation techniques in these figures. Numbering in the present figures is not intended to be consistent with numbering in FIGS. 1, 2A-C and 3 of U.S. Pat. No. 8,200,161.

FIG. 1 illustrates a block diagram of an exemplary embodiment of an RF communication coexistence system in which present embodiments may be implemented. Exemplary system 10 comprises a device 105, WLAN access point 110, BT access point 112 and base station 120.

In some embodiments, for example, WLAN access point (AP) 110 may comprise an access point implemented consistent with an 802.11-based (e.g., "WiFi") wireless network communication standard or an 802:16-based (e.g., "WiMax") wireless network communication standard. WLAN AP 110 may be representative of a WLAN comprising several network switches, routers, and access points, in any configuration. In some embodiments, for example, BT AP 112 may comprise one or more BT accessories, such as a headphone, headset, controller, keyboard, or pointing device. Other embodiments implementing other access points in accordance with other communications standards in the alternative or in addition to WLAN AP 110 and BT AP 112 are within the scope of the embodiments described herein, including in incorporated U.S. Pat. No. 8,200,161.

Base station 120 may comprise, for example, a base station of a cellular-based wireless network. In an exemplary embodiment, base station 120 comprises a station in an LTE communications network. In other embodiments base station 120 may comprise a station of any cellular-based wireless network. As generally described herein, base station 120 communicates according to a first communications specification or standard (i.e., a first type of wireless communication), WLAN AP 110 communicates according to a second communications specification or standard (i.e., a second type of wireless communication), and BT AP 112 communicates according to a third communications specification or standard (i.e., a third type of wireless communication). As discussed above, concurrent communications in accordance with first, second and third communications specifications may interfere with each other, leading to packet loss and/or disassociation with WLAN AP 110, BT AP 112 or base station 120.

Coexistence management, which may be implemented in device 105, for example, may alleviate or mitigate wireless communication interference (i.e., RF jamming) to permit concurrent communication of collocated wireless communications. Device 105 comprises front end 130, WLAN/BT module 140, LTE module 150, and host controller 160. Front end 130 comprises RF front end circuitry that supports wireless communications between device 105, WLAN AP 110, BT AP 112 and base station 120.

Front end 130 is an embodiment of communication circuitry configured to wirelessly communicate a first wireless signal in accordance with a first wireless communication standard (e.g., LTE) and wirelessly communicate a second wireless signal in accordance with a second wireless communication standard (e.g., BT) where, in at least some circumstances during concurrent communication, the first signal interferes with the second signal. The wireless communication circuitry may also be configured to wirelessly communicate in accordance with a third wireless communication standard (e.g., WLAN).

Front end 130 may comprise multiple RF transmitters and receivers. See, e.g., FIG. 2C in U.S. Pat. No. 8,200,161. Front end 130 may comprise one or more dedicated or shared antennas 132, mixers (not shown), duplexers (not shown), filters 134, amplifiers 136 and other circuitry in support of each wireless communication standard supported by device 105. Filters 134 may comprise digital or analog filtering circuitry, such as band pass, band stop and cellular blocking filters. For example, filters 134 may comprise surface acoustic wave (SAW) or bulk acoustic wave (BAW) filters. Amplifiers 136 may comprise one or more amplifiers each with one or more stages. Each stage may have fixed or variable, controllable, gain. Components and circuitry in front end 130, including one or more gain stages, may be specific to each communication standard or may be shared by multiple communication standards. For example, BT and WLAN may share one or more variable gain stages in an amplifier in front end 130 before splitting into BT-specific and WLAN-specific paths. BT and WLAN may arbitrate for control over any such shared components.

Front end 130 is coupled to and communicates with WLAN/BT module 140 by communication lines 137. Front end 130 is coupled to and communicates with LTE module 150 by communication lines 139. Communication lines 137, 139 may include control signaling, such as gain control signals to control gain in one or more stages of amplifiers in front end 130.

Host controller 160 executes host operating system (OS) 162 and host applications 164 with which a user may interact. Host controller 160 may coordinate overall operations of device 105, including operations of WLAN/BT module 140 and operations of LTE module 150. Further, although not shown, host controller 160 may control or coordinate other elements, components or modules of device 105, such as a display, speaker, microphone, and/or camera, for example. As described in further detail below, in one embodiment, host controller 160 comprises an integrated processor chip having access to one or more memory devices. Host controller 160 may be coupled to WLAN/BT module 140 and LTE module 150 via input/output (I/O) interface 180 and/or other communication interface(s), through which host controller 160 communicates various data and signals to WLAN/BT module 140 and LTE module 150.

WLAN/BT module 140 comprises various application layers including layer X 142, coexistence layer 144 and layer Y 146. WLAN/BT module 140 also comprises data queue 148, as further described below. Layers 142, 144, and 146 comprise abstraction layers of a system model of WLAN/BT module 140. For example, layers 142, 144, and 146 may be considered similar to layers of the Open Systems Interconnection ("OSI") model, such as session, transport, and network layers. It is noted that X and Y layers 142 and 146 support and communicate with coexistence layer 144 and, in various embodiments, may provide session management, flow control, logical and/or physical addressing and data transmission, among other functions. X and Y layers 142 and 146 are provided by way of example only and are not to be considered limiting. Other embodiments may omit these layers, substitute other layers or implement functionality or logic without layers. In other embodiments, data queue 148 may be implemented by one or more memory devices separate from WLAN/BT module 140 or may be combined within host controller 160.

Coexistence layer 144 is a coexistence manager that implements one or more algorithms or functionality to mitigate wireless communication interference to permit concurrent communications and, when that is not possible, sequential communications.

In some embodiments, in certain aspects, coexistence layer 144 may be similar to the transport layer of the OSI model. In the embodiment shown in FIG. 1, coexistence layer 144 operates to achieve communications coexistence of LTE, WLAN and BT communications. Communications coexistence is achieved, at least in part, according to a signaling scheme between WLAN/BT module 140 and LTE module 150. Coexistence layer 144 may be configured to establish, manage and maintain communications with WLAN AP 110 and BT AP 112. Coexistence layer or manager 144 may be configured to receive a warning signal indicating a future LTE transmission time. For example, coexistence layer 144 may also be configured to identify a priority or warning signal generated by LTE module 150. This signal, such as LTE_Tx 170, may indicate an imminent LTE transmission that is to occur at a future time. The time to transmission may be provided in the signal or may be understood according to a signaling specification. Coexistence layer 144 may be configured to analyze a timing pattern of the priority signal, e.g., as shown in FIG. 2.

Coexistence layer 144 may be configured to manage communications with WLAN AP 110 and BT AP 112. Management of communications may comprise selecting among one or more coexistence management or interference mitigation techniques, based on the priority signal, prevailing conditions indicated by one or more monitored parameters, the status of communications by WLAN AP 110 and BT AP 112 and timing to LTE transmission. Coexistence layer 144 may be configured to operate in accordance with one or more algorithms to determine what wireless interference mitigation action to take, if any, in response to the warning signal and to execute the determined action.

Figure 2:
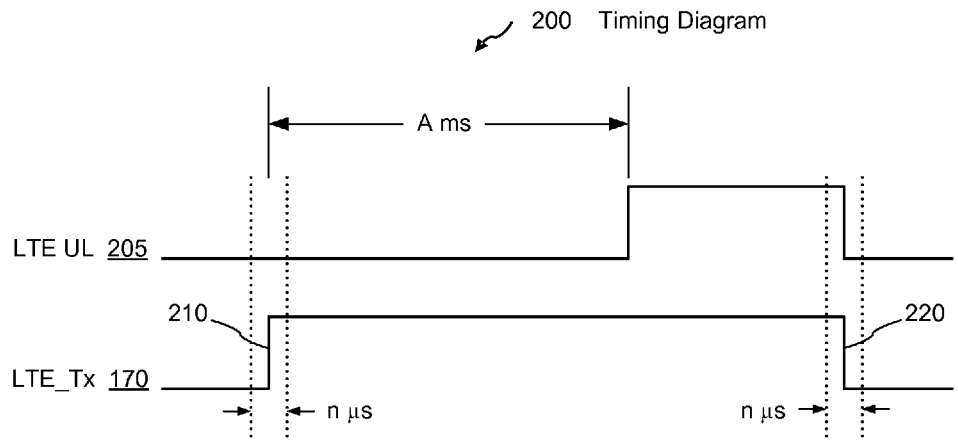
FIG. 2 illustrates an exemplary embodiment of a signal providing a warning of imminent transmission of a jammer signal.

For example, upon detection of imminent LTE transmission (e.g., LTE_Tx 170 as shown in FIG. 2), coexistence layer or manager 144 may automatically select a gain setting for one or more stages in a receiver in the wireless communication circuitry (e.g., front end(s) 130) to preserve the linearity of a BT or WLAN signal during concurrent communication where an LTE transmission operates as an RF jammer Gain settings may be communicated to one or more amplifier gain stages 136 via communication lines 137. A gain setting that may be selected during concurrent communication with an RF jammer transmission is "linear performance", as opposed to "high gain" or "sensitivity performance". Decreasing the gain of one or more receiver amplifier stages may avoid clipping, distortion and products that would render the BT or WLAN SoI unrecoverable. Gain settings may be implemented, for example, as a gain table stored in memory or as program logic. Coexistence layer or manager 144 may also be configured to, alternatively or additionally in response to detection of LTE-Tx 170, automatically request that a BT or WLAN transmitter (e.g., WLAN AP 110 or BT AP 112) increase wireless transmission power, which would increase a communication link margin for reception of the BT or WLAN signal by a receiver in front end(s) 130.

In some embodiments, interference mitigation techniques from which coexistence layer 144 may be configured to select include, without limitation, configuring one or more gain stages of a receiver in front end(s) 130 based on a detection of imminent transmission of an interfering signal and/or based on received signal strength indicator (RSSI) data, frequency hopping (e.g., changing a frequency channel or band) of BT and/or WLAN communications, assigning antennas to isolate BT and/or WLAN communications from LTE communications, arbitrating sequential or TDM communication of BT and/or WLAN communications relative to LTE communications and generating a relief request signal to LTE module 150. These and other interference mitigation techniques may be implemented alone, consecutively, alternately or concurrently with other interference mitigation techniques.

One or more parameters or prevailing conditions may be monitored and used to select one or more gain stages in front end(s) 130 (e.g., in response to detecting an imminent RF jammer signal) and to select and implement one or more interference mitigation techniques alone, consecutively, alternately or concurrently with other interference mitigation techniques. For example, transmission frequency channels or bands of LTE, BT and WLAN communications may be monitored to determine a degree of isolation between them. A transmission power of LTE, BT and WLAN communications may be monitored to determine a degree of isolation. A transmission modulation bandwidth of LTE, BT and WLAN communications may be monitored to determine a degree of isolation. Physical isolation (e.g., distance between circuitry and antennas) between an LTE transmitter and BT or WLAN receiver, or vice versa, may be monitored to determine a degree of isolation. The types of filtering by a receiver in front end(s) 130 may be monitored to determine tolerances, i.e., under what conditions a received SoI may be recoverable. A temperature of a receiver or device 105 may be monitored to determine how components such as certain filters may operate under prevailing conditions.

In order to permit concurrent transmission of an LTE signal and reception of a BT or WLAN signal, or vice versa, one or more of these and other parameters may be used by coexistence manager or layer 144 to determine gain setting(s) in one or more gain stages of a receiver in front end(s) 130. These gain stages and the algorithm(s) responsible for selecting them may be implemented in a wide variety of forms, including gain table(s) or hardware and/or software logic. One or more of these and other parameters may also be used to select and implement one or more interference mitigation techniques alone, consecutively, alternately or concurrently.

LTE module 150 comprises various application layers including layer X 152, coexistence layer 154 and layer Y 156. LTE module 150 also comprises data queue 158, as further described below. Layers 152, 154, and 156 comprise abstraction layers of a system model of LTE module 150. For example, layers 152, 154, and 156 may be considered similar to layers of the Open Systems Interconnection ("OSI") model, such as session, transport, and network layers. It is noted that X and Y layers 152 and 156 support and communicate with coexistence layer 154 and, in various embodiments, may provide session management, flow control, logical and/or physical addressing and data transmission, among other functions. X and Y layers 152 and 156 are provided by way of example only and are not to be considered limiting. Other embodiments may omit these layers, substitute other layers or implement functionality or logic without layers. In other embodiments, data queue 158 may be implemented by one or more memory devices separate from LTE module 150 or may be combined within host controller 160.

Coexistence layer 154 is a coexistence manager, which implements one or more algorithms or functionality to mitigate wireless communication interference to permit concurrent communications and, when that is not permitted, sequential communications. In some embodiments, in certain aspects, coexistence layer 154 may be similar to the transport layer of the OSI model. In the embodiment shown, coexistence layer 154 operates to achieve communications coexistence of LTE, WLAN and BT communications. Communications coexistence is achieved, at least in part, according to a signaling scheme between WLAN/BT module 140 and LTE module 150. Coexistence layer 154 may be configured to establish, manage and maintain communications with base station 120. Coexistence layer 154 may also be configured to forecast data communications with base station 120 and generate one or more priority or warning signals based on the forecast. This signal, such as LTE_Tx 170, may indicate an imminent LTE transmission that is to occur at a future time. Coexistence layer 154 may also be configured to identify a relief request signal and manage communications with base station 120 based on the relief request signal.

In some embodiments, LTE module 150 may be implemented similar to BT/WLAN module 140 as described above, except for LTE communication relative to BT and WLAN communication. Thus, in some embodiments, imminent transmission warning or priority signals may also be provided by WLAN/BT module 140 to LTE module 150, which could be configured to respond similarly to WLAN/BT module 140 by selecting one or more gain settings for one or more gain stages 136. Gain settings may be communicated to one or more gain stages 136 via communication lines 139. Other embodiments with other types of RF communication, warnings and coexistence functionality may be implemented by one or more coexistence modules.

Coexistence layer 154 may be configured to manage communications with base station 120. In some embodiments, management may include selecting among one or more coexistence management or interference mitigation techniques pursuant to one or more algorithms. Similar to coexistence layer 144, coexistence technique selection may be based on prevailing conditions indicated by monitored parameters, including the status of communications by LTE module 150.

As described in further detail below with regard to FIG. 3, in one embodiment, both the WLAN/BT module 140 and LTE module 150 comprise integrated processor chips (e.g. Application Specific Integrated Circuit ("ASIC")) comprising and/or having access to one or more memory devices.

Details of a specific embodiment involving adaptation to a coexistence signaling scheme will now be presented. Presently disclosed techniques for mitigating wireless communication interference to permit concurrent communication may utilize a sequential or TDM or TDD coexistence signaling scheme to engage in concurrent or FDM or FDD communication (instead of sequential or TDM communication) when prevailing conditions permit, as provided by monitored parameters and within the capabilities of components in device 105.

A coexistence signaling scheme may be used by device 105 to facilitate the coexistence of communications standards that may otherwise interfere with each other. As illustrated in FIG. 1, WLAN/BT module 140 and LTE module 150 share coexistence signaling scheme signals LTE_Tx 170, LTE_Rx 172, and WLAN_Relief 174. In exemplary embodiments, LTE_Tx 170 and LTE_Rx 172 signals are generated by LTE module 150 and provided to WLAN/BT module 140 while WLAN_Relief 174 signal is generated by WLAN/BT module 140 and provided to LTE module 150. WLAN/BT module 140 and LTE module 150 may be configured to generate, identify, and act upon LTE_Tx 170, LTE_Rx 172, and WLAN_Relief 174 signals. Communication of signals 170, 172, and 174 between WLAN/BT module 140 and LTE module 150 may be facilitated by a direct connection between general purpose pins on WLAN/BT module 140 and general purpose pins on LTE module 150. Other coupling techniques are within the scope of embodiments described herein.

In one embodiment, LTE_Tx 170 indicates to WLAN/BT module 140 that an LTE transmission is scheduled to occur within a predetermined time. If a concurrent or FDM interference mitigation technique is selected, WLAN/BT module 140 may be configured to respond to a rising or falling edge of LTE_Tx 170 as described above. In some embodiments, the concurrent interference mitigation technique described herein may override other interference mitigation techniques, such as when prevailing conditions are met according to monitored parameters. Alternatively, if a sequential or TDM interference mitigation technique is selected, WLAN/BT module 140 may be configured to respond to a rising or falling edge of LTE_Tx 170 by suspending its communications with WLAN AP 110 or BT AP 112. By suspending its communications, WLAN/BT module 140 may prevent desensitization of its receiver caused by an LTE transmission. The suspension of communications may involve the transmission of one or more 802.11-based protocol commands or messages from WLAN/BT module 140 to WLAN AP 110 or BT AP 112. In one embodiment, WLAN/BT module 140 may suspend communications with WLAN AP 110 or BT AP 112 by entering a power-save or power-management mode. In general, receiver desensitization occurs when a receiver is directly (or by intermodulation) frequency-overlapped by transmission frequencies of other communication circuit(s), effectively jamming the receiver.

In some embodiments, assertion of LTE_Tx 170 by LTE module 150 may occur before every LTE transmission. In other embodiments, assertion of LTE_Tx 170 may be limited to certain intermodulation conditions between WLAN/BT module 140 and LTE module 150. The intermodulation conditions may depend upon which LTE channel is being relied upon for transmission (e.g., LTE band 7 vs. band 38), for example. In other words, logic responsible for asserting LTE_Tx 170 may take into account one or more monitored parameters.

LTE_Rx 172 indicates to WLAN/BT 140 that an LTE signal is scheduled to be received by LTE module 150 within a predetermined time. In some embodiments, WLAN/BT module 140 may be configured to respond to a rising or falling edge of LTE_Rx 172 by reducing a transmission power of transmissions (or suspend transmissions) to WLAN AP 110 or BT AP 112. In this manner, WLAN/BT module 140 can prevent or reduce intermodulation products, for example, from falling on a receiver 133 receiving LTE communications.

In some embodiments, assertion of the LTE_Rx 172 by LTE module 150 may occur before every LTE signal is received. In other embodiments, assertion of LTE_Rx 172 may be limited to certain intermodulation conditions between WLAN/BT module 140 and LTE module 150. The intermodulation conditions may depend upon which WLAN channel is being relied upon for transmission (e.g., WLAN channel 6 vs. 11), for example. In other words, logic responsible for asserting LTE_Rx 172 may take into account one or more monitored parameters.

In one embodiment, WLAN_Relief 174 indicates a distress condition of WLAN/BT module 140 to LTE module 150. For example, if transmissions by LTE module 150 have been active with a high duty cycle for a significant period of time and WLAN or BT throughput over this time period has been low, the data queue 148 of the WLAN/BT module 140 may be full. Thus, WLAN_Relief 174 may indicate it is necessary for WLAN/BT module 140 to transfer data. In other cases of distress, a data queue of WLAN AP 110 or BT AP 112 may be full, making it necessary for WLAN/BT module 140 to receive data.

FIG. 2 illustrates an exemplary embodiment of a signal providing a warning of imminent transmission of a jammer signal. Note that signal timing is not necessarily drawn to scale. Further, logic levels may be different from those illustrated in other embodiments.

As shown in FIG. 2, exemplary timing of LTE_Tx 170 is illustrated. At edge 210, LTE_Tx 170 transitions from a low logic level to a high logic level. As indicated in FIG. 2, in one embodiment, the transition from low to high occurs "A" milliseconds (ms) before an actual UL (i.e., transmission) of an LTE signal. In one embodiment, the period "A" may be 200 ms, although the period may vary within and between embodiments. Advance warning provided by period A is what may be leveraged to act during period A to adjust gain settings in one or more gain stages 136 to permit concurrent communication during LTE communication. Also during period A, WLAN/BT module 140 may alternately or additionally request that WLAN AP 110 or BT AP 112 increase power to expand link margins for WLAN/BT module 140. As illustrated, LTE_Tx 170 remains at a logic high level until edge 220, when the actual LTE transmission, or series of transmissions, concludes. According to the coexistence signaling scheme, a time period of "n" microseconds (μs) is attributed to or expected for jitter between edges.

Upon identification of edge 210, WLAN/BT module 140 may perform certain tasks, update or adapt communications parameters, and decide to engage in or suspend WLAN and/or BT communications (transmission, reception or both) during and after period A. The WLAN/BT 140 may transmit one or more 802.11-based protocol commands or messages from the WLAN/BT 140 to the access point 110, with or without the transmission of data. For example, the WLAN/BT 140 may transmit data in connection with a CTS-to-Self announcement.

Figure 3:
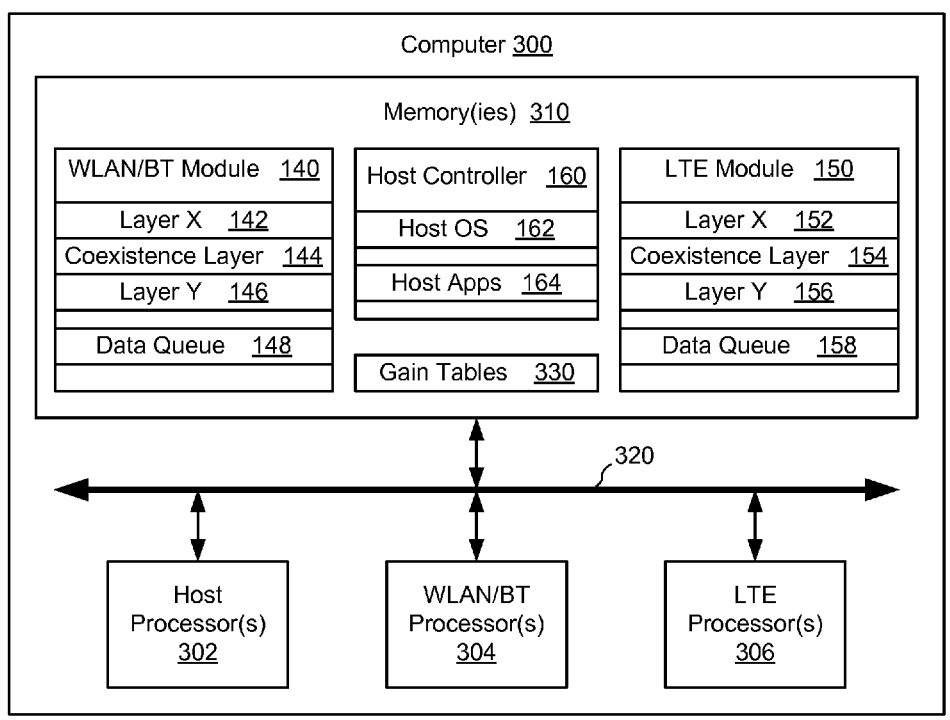
FIG. 3 is a block diagram of a computer in which embodiments may be implemented.

FIG. 3 is a block diagram of a computer 300 in which embodiments may be implemented. Device 105 of FIG. 1 may be implemented, at least in part, in computer 300. Computer 300 comprises various processing circuits or processors and memory, including host processor(s) 302, WLAN/BT processor(s) 304, LTE processor(s) 306, memory (or memories) 310, and local interface 320. Local interface 320 may comprise, for example, a data bus with an accompanying address/control bus or other bus structure.

Each of host processor(s) 302, WLAN/BT processor(s) 304, and LTE processor(s) 306 may represent multiple processors and/or multiple processor cores. Memory 310 may represent multiple memories that operate in parallel processing circuits, respectively or in combination. In one embodiment, each of host processor(s) 302, WLAN/BT processor(s) 304, and LTE processor(s) 306 may be implemented as general purpose processors, circuits, state machines, or combinations thereof that employ any one of or a combination of technologies. These technologies may include, but are not limited to, discrete logic circuits having logic gates for implementing various logic functions upon an application of one or more data signals, ASICs having appropriate logic gates, field-programmable gate arrays (FPGAs), or other components, etc. Such technologies are generally well known by those skilled in the art.

In various embodiments, memory 310 stores data and software or executable-code components accessible or executable by host processor(s) 302, WLAN/BT processor(s) 304, and LTE processor(s) 306. For example, memory 310 may store data and software or executable-code components associated with abstract and coexistence layers 142, 144, 146, 152, 154, and 156, data queues 148 and 158, and host OS 162 and applications 164 illustrated in FIG. 1 and again in FIG. 3. Memory 310 may also store frontend amplifier gain tables 330. Gain table data may alternatively be integrated into executable programs per gain control algorithms.

As discussed above, memory 310 stores software for execution by host processor(s) 302, WLAN/BT processor(s) 304, and LTE processor(s) 306, along with accessible data, such as gain tables 330. In this respect, the terms "executable" or "for execution" refer to software forms that can ultimately be run or executed by host processor(s) 302, WLAN/BT processor(s) 304, and LTE processor(s) 306, whether in source, object, machine, or other form. Any of host processor(s) 302, WLAN/BT processor(s) 304, and LTE processor(s) 306 may retrieve executable code stored in memory 310 and, based on the execution of that code, be directed to implement any of a variety of processes.

In various embodiments, memory 310 may include both volatile and nonvolatile memory and data storage components, or any combination thereof. Random access memory (RAM) may comprise, for example, a static random access memory (SRAM), dynamic random access memory (DRAM), or magnetic random access memory (MRAM), and/or other similar memory device. Read only memory (ROM) may comprise, for example, a programmable read-only memory (PROM), erasable programmable read-only memory (EPROM), electrically erasable programmable read-only memory (EEPROM), or other similar memory device.

It will be recognized that functionality described in devices and systems, their respective components, and/or the techniques described herein may be implemented in hardware (e.g., logic/electrical circuitry), software, firmware, or any combination thereof. Where any component discussed herein is implemented in the form of software, any one of a number of programming languages may be employed such as, without limitation, C, C++, C#, Objective C, Java®, JavaScript®, Perl, PHP, Visual Basic®, Python®, Ruby, Flash®, or other processor-specific or proprietary programming languages.

The disclosed technologies can be put into practice using software, firmware, and/or hardware implementations other than those described herein. Any software, firmware, and/or hardware implementations suitable for performing the functions described herein can be used.

Figure 4:
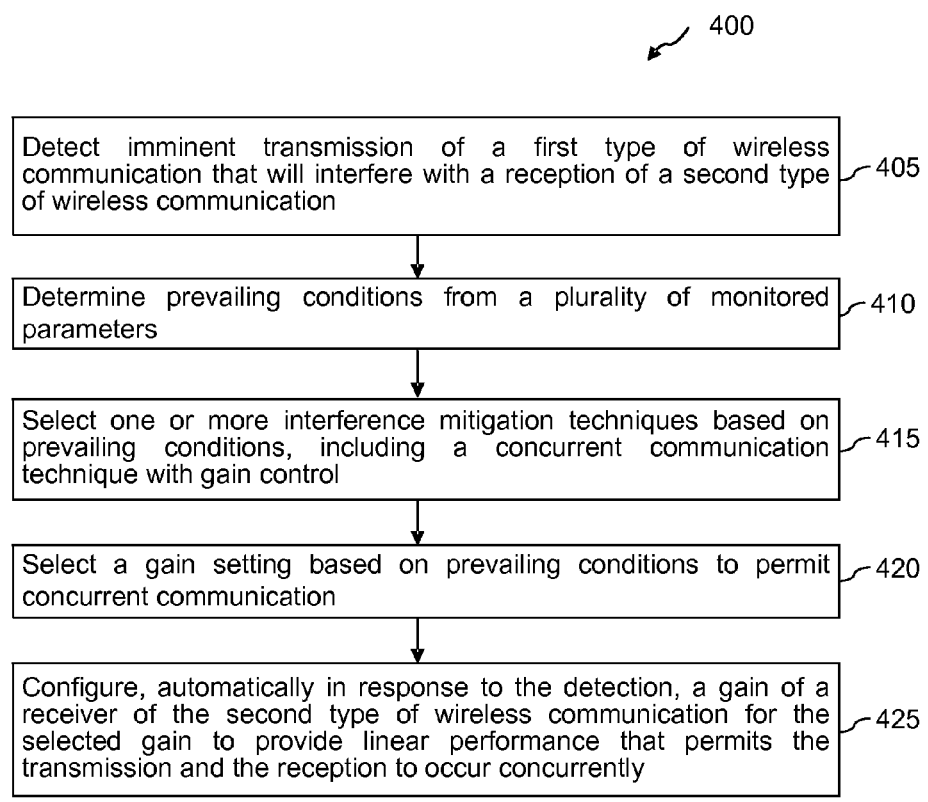
FIG. 4 is a flowchart that illustrates an exemplary embodiment of a method of mitigating wireless interference to permit concurrent wireless communication.

Embodiments may also be implemented in processes or methods. For example, FIG. 4 is a flowchart 400 that illustrates an exemplary embodiment of a method of mitigating wireless interference to permit concurrent wireless communication. System 100, device 105, computer 300 and other embodiments may operate according to the method of flowchart 400. The method of flowchart 400 comprises steps 405 to 425 to mitigate wireless communication between different types of wireless communication. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 4. FIG. 4 is simply one of many possible embodiments. Embodiments may implement fewer, more or different steps. Steps 405-430, as well as steps in other embodiments, may be implemented, for example, within the context of the method illustrated in FIG. 3 of U.S. Pat. No. 8,200,161.

The method of flowchart 400 begins with step 405. In step 405, imminent transmission of a first type of wireless communication that will interfere with a reception of a second type of wireless communication is detected. The first and second types of wireless communication may be any two different types of wireless communication. In presented embodiments, the first type of wireless communication may be LTE and the second type of wireless communication may be BT or WLAN, but this may vary in other embodiments. For example, as shown in FIG. 1, LTE transmission signal, e.g., LTE_Tx 170, is received at WLAN/BT module 140. An exemplary embodiment is shown in greater detail in FIG. 2, which shows that WLAN/BT module 140 has A ms to react to the LTE transmission before the LTE transmission occurs (e.g., begins).

In step 410, prevailing conditions from a plurality of monitored parameters are determined. For example, as shown in FIG. 1, host controller 160 may provide monitored parameters to WLAN/BT module 140, and specifically to coexistence layer 144, via I/O 180. LTE module 150 may provide monitored parameters to WLAN/BT module 140, and specifically to coexistence layer 144, via the coexistence signaling scheme. WLAN/BT module 140, and specifically coexistence layer 144, may evaluate the monitored parameters according to one or more algorithms to determine prevailing conditions. Similarly, as shown in FIG. 1, host controller 160 may provide monitored parameters to LTE module 160, and specifically to coexistence layer 154, via I/O 180. WLAN/BT module 140 may provide monitored parameters to LTE module 150, and specifically to coexistence layer 154, via the coexistence signaling scheme. LTE module 150, and specifically coexistence layer 154, may evaluate the monitored parameters according to one or more algorithms to determine prevailing conditions.

A variety of parameters may be monitored and used to determine prevailing conditions. For example, a transmission frequency channel or band of the first and second types of wireless communication may be monitored to determine a degree of isolation between them. A transmission power of the first and/or second types of wireless communication may be monitored to determine a degree of isolation. Power at transmitting or receiving devices may be identified by control circuitry or may be detected, such as by received signal strength indicator (RSSI) data. A transmission modulation bandwidth of the first and/or second types of wireless communication may be monitored to determine a degree of isolation. Physical isolation (e.g., distance between circuitry and antennas) between the transmitter of the first type of wireless communication and the receiver of the second type of wireless communication may be monitored to determine a degree of isolation. The type of filtering by the receiver may be monitored to determine tolerances, i.e., under what conditions the received SoI may be recoverable. A temperature of the receiver may be monitored to determine how components such as certain filters may operate under prevailing conditions. A plurality of these parameters may be evaluated to determine prevailing conditions.

In step 415, one or more interference mitigation techniques based on prevailing conditions are selected, including a concurrent communication technique with gain control. For example, as shown in claim 1, coexistence manager or layer 144 or coexistence manager or layer 154 may select one or more interference mitigation techniques based on prevailing conditions.

Interference mitigation techniques may be implemented alone, consecutively, alternately or concurrently with other interference mitigation techniques. Techniques include, without limitation, configuring one or more gain stages of a receiver to permit concurrent communication, frequency hopping (e.g., changing a frequency channel or band), assigning an antenna for one or both the first and second types of wireless communication and arbitrating sequential communication of the first and second types of wireless communication by time division multiplexing (TDM). Regarding the last limitation, WLAN-relief 174 may be used to arbitrate TDM.

In step 420, a gain setting based on prevailing conditions to permit concurrent communication is selected. For example, as shown in FIG. 3, WLAN/BT module 140, and specifically coexistence layer 144, executes logic to select one or more gain settings in gain tables 330 based on one or more algorithms taking account of prevailing conditions. Similarly, as shown in FIG. 3, LTE module 150, and specifically coexistence layer 154, executes logic to select one or more gain settings in gain tables 330 based on one or more algorithms taking into account prevailing conditions.

In step 425, a gain of a receiver of the second type of wireless communication is automatically configured for the selected gain to provide linear performance that permits the transmission and the reception to occur concurrently. Depending on which type of wireless signal is being received, the second type could be any type. In embodiments presented herein, the second type may be WLAN, BT or LTE. For example, as shown in FIG. 1, WLAN/BT module 140 communicates one or more selected gain settings via communication lines 137 to control one or more amplifier gain stages 136 for WLAN and/or BT receivers in receivers 133. One or more gain stages of the receiver may be common to the second type of wireless communication and a third type of wireless communication, such as in device 105 with BT and WLAN capability. In some embodiments, WLAN and BT may arbitrate for control over gain settings in common stages. Similarly, as shown in FIG. 1, LTE module 150 communicates one or more selected gain settings via communication lines 139 to control one or more amplifier gain stages 136 for an LTE receiver in receivers 133.

Relative to a sensitivity performance configuration for the receiver, a linear performance configuration may be a reduction in gain in one or more stages in the receiver. Additionally or alternatively in response to the detection, a transmitter of the second type of wireless communication (such as a BT or WLAN access point) may be requested to increase wireless transmission power, thereby increasing a communication link margin for reception of the second type of wireless communication.

Figure 5:
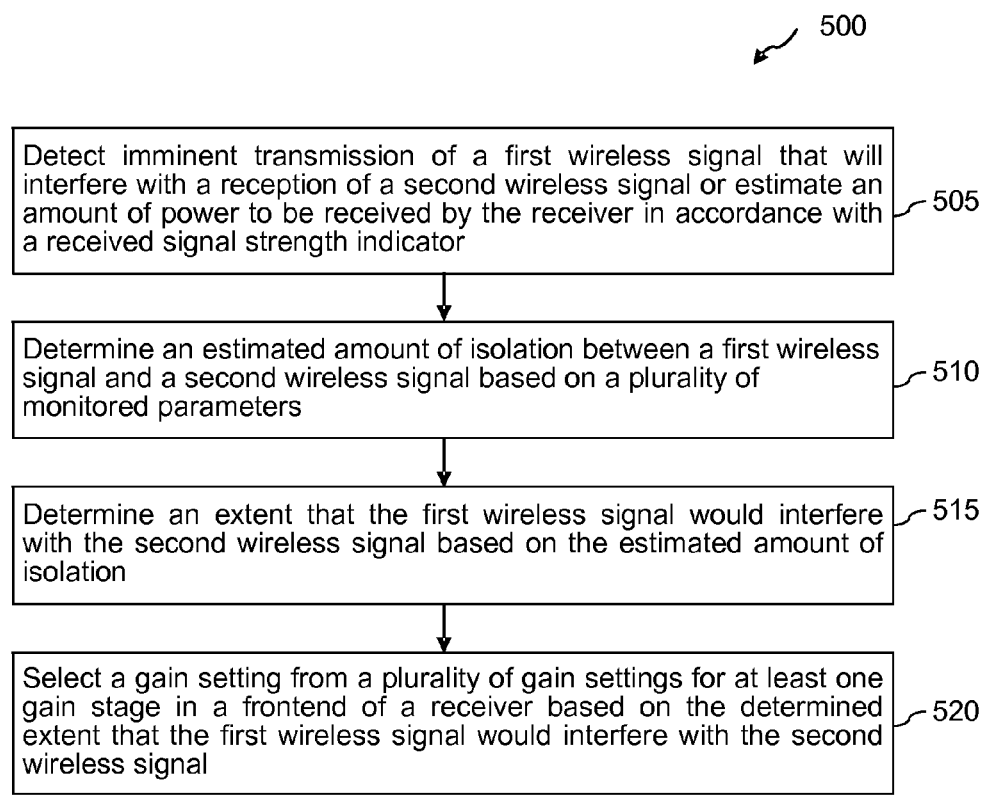
FIG. 5 is a flowchart that illustrates another exemplary embodiment of a method of mitigating wireless interference to permit concurrent wireless communication.

FIG. 5 is a flowchart 500 that illustrates another exemplary embodiment of a method of mitigating wireless interference to permit concurrent wireless communication. System 100, device 105, computer 300 and other embodiments may operate according to the method of flowchart 500. The method of flowchart 500 comprises steps 505 to 520 to mitigate wireless communication between different types of wireless communication. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 5. FIG. 5 is simply one of many possible embodiments. Embodiments may implement fewer, more or different steps. Steps 505-520, as well as steps in other embodiments, may be implemented, for example, within the context of the method illustrated in FIG. 3 of U.S. Pat. No. 8,200,161.

The method of flowchart 500 begins with step 505. In step 505, imminent transmission of a first type of wireless communication that will interfere with a reception of a second type of wireless communication is detected or, alternatively or additionally, an amount of power to be received by the receiver in accordance with a received signal strength indicator (RSSI) is estimated. RSSI data may be a monitored parameter. The first and second types of wireless communication may be any two different types of wireless communication. In presented embodiments, the first type of wireless communication may be LTE and the second type of wireless communication may be BT or WLAN, but this may vary in other embodiments. For example, as shown in FIG. 1, LTE transmission signal, e.g., LTE_Tx 170, is received at WLAN/BT module 140. An exemplary embodiment is shown in greater detail in FIG. 2, which shows that WLAN/BT module 140 has A ms to react to the LTE transmission before the LTE transmission occurs.

In step 510, an estimated amount of isolation between a first wireless signal and a second wireless signal is determined based on a plurality of monitored parameters. For example, as shown in FIG. 1, host controller 160 may provide monitored parameters to WLAN/BT module 140, and specifically to coexistence layer 144, via I/O 180. LTE module 150 may provide monitored parameters to WLAN/BT module 140, and specifically to coexistence layer 144, via the coexistence signaling scheme. WLAN/BT module 140, and specifically coexistence layer 144, may evaluate the monitored parameters according to one or more algorithms to determine an estimated amount of isolation. Similarly, as shown in FIG. 1, host controller 160 may provide monitored parameters to LTE module 160, and specifically to coexistence layer 154, via I/O 180. WLAN/BT module 140 may provide monitored parameters to LTE module 150, and specifically to coexistence layer 154, via the coexistence signaling scheme. LTE module 150, and specifically coexistence layer 154, may evaluate the monitored parameters according to one or more algorithms to determine an estimated amount of isolation.

Wireless communication interference among different types of wireless communication may be mitigated by determining an estimated amount of isolation between a first wireless signal in accordance with a first wireless communication standard and a second wireless signal in accordance with a second wireless communication standard. This isolation can be determined according to a variety of monitored parameters. For example, a transmission frequency channel or band of the first and second types of wireless communication may be monitored to determine a degree of isolation between them. A transmission power of the first and/or second types of wireless communication may be monitored to determine a degree of isolation. Power at transmitting or receiving devices may be identified by control circuitry or may be detected, such as by received signal strength indicator (RSSI) data. A transmission modulation bandwidth of the first and/or second types of wireless communication may be monitored to determine a degree of isolation. Physical isolation (e.g., distance between circuitry and antennas) between the transmitter of the first type of wireless communication and the receiver of the second type of wireless communication may be monitored to determine a degree of isolation. The type of filtering by the receiver may be monitored to determine tolerances, i.e., under what conditions the received SoI may be recoverable. A temperature of the receiver may be monitored to determine how components such as certain filters may operate over a temperature range. A plurality of these parameters may be evaluated to determine estimated isolation.

In step 515, an extent that the first wireless signal would interfere with the second wireless signal is determined based on the estimated amount of isolation. For example, as shown in FIG. 1, WLAN/BT module 140, and specifically coexistence layer 144, may evaluate the estimated isolation according to one or more algorithms to determine an extent that the first signal would interfere with the second signal. In accordance with this example, the first signal is LTE and the second signal is WLAN or BT. In another example, as shown in FIG. 1, LTE module 150, and specifically coexistence layer 154, may evaluate the estimated isolation according to one or more algorithms to determine an extent that the first signal would interfere with the second signal. In accordance with this example, the first signal is WLAN or BT and the second signal is LTE.

In step 520, a gain setting is selected from a plurality of gain settings for at least one gain stage in a frontend of a receiver based on the determined extent that the first wireless signal would interfere with the second wireless signal. For example, as shown in FIG. 3, WLAN/BT module 140, and specifically coexistence layer 144, executes logic to select one or more gain settings in gain tables 330 based on one or more algorithms taking account of the determined extent of interference. Similarly, as shown in FIG. 3, LTE module 150, and specifically coexistence layer 154, executes logic to select one or more gain settings in gain tables 330 based on one or more algorithms taking account of the determined extent of interference.

Additionally, a gain of a receiver of the second type of wireless communication may be automatically configured for the selected gain to permit the transmission and the reception to occur concurrently. Depending on which type of wireless signal is being received, the second type could be any type. In embodiments presented herein, the second type may be WLAN, BT or LTE. For example, as shown in FIG. 1, WLAN/BT module 140 communicates one or more selected gain settings via communication lines 137 to control one or more amplifier gain stages 136 for WLAN and/or BT receivers in receivers 133. One or more gain stages of the receiver may be common to the second type of wireless communication and a third type of wireless communication, such as in device 105 with BT and WLAN capability. In some embodiments, WLAN and BT may arbitrate for control over gain settings in common stages. Similarly, as shown in FIG. 1, LTE module 150 communicates one or more selected gain settings via communication lines 139 to control one or more amplifier gain stages 136 for an LTE receiver in receivers 133.

IV. Conclusion

Methods, systems, and apparatuses are described for mitigating wireless transmission interference with collocated radios to permit concurrent radio operation. In response to detection of imminent transmission of interfering wireless (i.e., RF jammer) signals, gain settings of one or more stages of front-end receiver amplifiers may be quickly configured to permit concurrent or frequency division operation instead of consecutive or time-division operation. This expansion of concurrent operation may improve communication bandwidth and/or may produce reliable, consistent results. Gain control responsive to detection of imminent RF jamming may maintain amplification in a linear range where interference can be filtered out. Receiver gain may be shifted from a default high gain or high sensitivity setting to lower gain to maintain integrity of a signal of interest (SoI), which avoids clipping, distortion and unwanted products caused by a high power jamming signal that could otherwise make it impossible to recover the SoI. This mitigation technique supplements and/or replaces other interference mitigation techniques.

Embodiments have been presented by way of example only, and not limitation. Embodiments are not limited to the functional blocks, detailed examples, steps, order or the entirety of subject matter presented in the figures.

Proper interpretation of subject matter described herein and claimed hereunder is limited to patentable subject matter under 35 U.S.C. §101. A method is a process defined by 35 U.S.C. §101. A circuit, device, apparatus, machine, system, computer, module, media and the like is a machine and/or manufacture defined by 35 U.S.C. §101. A device, as defined herein, is a machine or manufacture as defined by 35 U.S.C. §101. A device may comprise, for example but not limited to, an amplifier, wireless device, communications device, receiver, transmitter, transceiver, etc. Devices may be digital, analog or a combination thereof. Devices may be implemented with any semiconductor technology.

Techniques, including methods, described herein may be implemented in hardware (digital and/or analog) or a combination of hardware, software and/or firmware. Techniques described herein may be implemented in one or more components. Embodiments may comprise computer program products comprising logic (e.g., in the form of executable program code or modules implementing described functionality) stored on any computer useable medium, which may be integrated in or separate from other components. Such program code, when executed in one or more processors, causes a device to operate as described herein. Devices in which embodiments may be implemented may include RAM and ROM storage, such as storage drives, memory devices, and further types of computer-readable media, such as but not limited to, a hard disk, a removable magnetic disk, a removable optical disk and flash memory.

What is claimed is:

1. A method in an electronic device comprising:
mitigating wireless communication interference among a plurality of different types of wireless communication by:
detecting imminent transmission of a first type of wireless communication that will interfere with a reception of a second type of wireless communication; and
configuring by the electronic device, automatically in response to the detection, a gain for an amplifier stage of a receiver of the second type of wireless communication for linear performance that permits the transmission and the reception to occur concurrently, the gain and the amplifier stage being common to the second type of wireless communication and a third type of wireless communication.

2. The method of claim 1, wherein the linear performance configuration comprises a reduction in gain from a sensitivity performance configuration.

3. The method of claim 1, wherein the first type of wireless communication comprises Long Term Evolution (LTE), the second type of wireless communication comprises Wireless Local Area Network (WLAN) and the third type of wireless communication comprises BlueTooth (BT).

4. The method of claim 1, wherein the first type of wireless communication comprises Long Term Evolution (LTE), the second type of wireless communication comprises BlueTooth (BT) and the third type of wireless communication comprises Wireless Local Area Network (WLAN).

5. The method of claim 1, further comprising:
requesting, automatically in response to the detection, a transmitter of the second type of wireless communication to increase wireless transmission power, thereby increasing a communication link margin for the second type of wireless communication.

6. The method of claim 1, further comprising:
monitoring a plurality of parameters; and
selecting the gain of the receiver based on the plurality of parameters.

7. The method of claim 6, wherein the plurality of parameters comprises at least two of:
a transmission frequency channel or band of the first type of wireless communication;
a transmission frequency channel or band of the second type of wireless communication;
a transmission power of the first type of wireless communication;
a transmission modulation bandwidth of the first type of wireless communication;
a physical isolation between a transmitter of the first type of wireless communication and the receiver of the second type of wireless communication;
a link margin of the second type of wireless communication;
a type of filtering performed by the receiver; and
a temperature of the receiver.

8. The method of claim 1, further comprising:
selecting an interference mitigation technique that mitigates the wireless communication interference in accordance with the steps of claim 1 from a plurality of interference mitigation techniques alone or in conjunction with one or more of the following interference mitigation techniques:
configuring the gain of the receiver based on received signal strength indicator (RSSI) data;
frequency hopping or changing a frequency channel or band of the second type of wireless communication;
dynamically assigning an antenna for one or both the first and second types of wireless communication to mitigate the wireless communication interference; or
arbitrating sequential communication of the first and second types of wireless communication by time division multiplexing (TDM).

9. The method of claim 8, wherein the selecting is based on at least two of:
a transmission frequency channel or band of the first type of wireless communication;
a transmission frequency channel or band of the second type of wireless communication;
a transmission power of the first type of wireless communication;
a transmission modulation bandwidth of the first type of wireless communication;
a physical isolation between a transmitter of the first type of wireless communication and the receiver of the second type of wireless communication;
a type of filtering performed by the receiver; and
a temperature of the receiver.

10. A system comprising:
communication circuitry configured to wirelessly communicate a first wireless signal in accordance with a first wireless communication standard and wirelessly communicate a second wireless signal in accordance with a second wireless communication standard where, in at least some circumstances during concurrent communication, the first signal interferes with the second signal; and
a coexistence manager configured to:
perform an interference mitigation technique that includes selection, automatically in response to receipt of a warning signal indicating a future transmission time for the first wireless signal, of a gain setting for a receiver in the communication circuitry to preserve linearity of reception of the second wireless signal during concurrent communication of the first and second wireless signals; and
request, automatically in response to receipt of the warning signal, a transmitter of the second wireless signal to increase wireless transmission power, thereby increasing a communication link margin for reception of the second wireless signal.

11. The system of claim 10, wherein the communication circuitry is configured to wirelessly communicate in accordance with a third wireless communication standard; and
wherein the gain setting of the receiver is common to the second and third wireless communication standards.

12. The system of claim 11, wherein the first wireless communication standard comprises Long Term Evolution (LTE), the second wireless communication standard comprises BlueTooth (BT) and the third wireless communication standard comprises Wireless Local Area Network (WLAN).

13. The system of claim 11, wherein the first wireless communication standard comprises Long Term Evolution (LTE), the second wireless communication standard comprises Wireless Local Area Network (WLAN) and the third wireless communication standard comprises BlueTooth (BT).

14. The system of claim 10, wherein the coexistence manager is further configured to monitor a plurality of parameters and to select the gain setting based on the plurality of parameters.

15. The system of claim 14, wherein the plurality of parameters comprises at least two of:

a transmission frequency channel or band of the first type of wireless communication;
a transmission frequency channel or band of the second type of wireless communication;
a transmission power of the first type of wireless communication;
a transmission modulation bandwidth of the first type of wireless communication;
a physical isolation between a transmitter of the first type of wireless communication and the receiver of the second type of wireless communication;
a type of filtering performed by the receiver; and
a temperature of the receiver.

16. The system of claim 10, wherein the coexistence manager is further configured to:
    select the interference mitigation technique recited in claim 10 from a plurality of interference mitigation techniques that includes one or more of the following interference mitigation techniques:
        configure the gain setting of the receiver based on received signal strength indicator (RSSI) data;
        frequency hop or change a frequency channel or band of the second wireless signal;
        dynamically assign an antenna for one or both the first and second wireless signals to preserve linearity of reception of the second wireless signal during concurrent communication of the first and second wireless signals; or
        arbitrate sequential communication of the first and second wireless signals by time division multiplexing (TDM).

17. The system of claim 16, wherein the selection is based on at least two of:
    a transmission frequency channel or band of the first type of wireless communication;
    a transmission frequency channel or band of the second type of wireless communication;
    a transmission power of the first type of wireless communication;
    a transmission modulation bandwidth of the first type of wireless communication;
    a physical isolation between a transmitter of the first type of wireless communication and the receiver of the second type of wireless communication;
    a type of filtering performed by the receiver; and
    a temperature of the receiver.

18. A method in an electronic device of a user comprising:
    determining, by the electronic device, an estimated amount of isolation at the electronic device between a first wireless signal in accordance with a first wireless communication standard and a second wireless signal in accordance with a second wireless communication standard;
    determining, by the electronic device, an extent that the first wireless signal would interfere with the second wireless signal at the electronic device based on the estimated amount of isolation; and
    selecting, by the electronic device, a gain setting from a plurality of gain settings for at least one gain stage in a frontend of a receiver of the electronic device based on the determined extent that the first wireless signal would interfere with the second wireless signal.

19. The method of claim 18, wherein determining the estimated amount of isolation comprises:
    determining the estimated amount of isolation in response to at least one of:
        detecting imminent transmission of the first wireless signal; or
        estimating an amount of power to be received by the receiver in accordance with a received signal strength indicator (RSSI) technique.

20. The method of claim 19, wherein the estimated amount of isolation is based on one or more of a frequency band or channel of the first and second wireless signals, a power of the first and second wireless signals, a modulation bandwidth of the first wireless signal, a temperature of the receiver, antennas communicating the first and second signals.

* * * * *